United States Patent
Fu

(10) Patent No.: US 8,769,125 B2
(45) Date of Patent: *Jul. 1, 2014

(54) METHOD AND APPARATUS FOR ENSURING TRANSPORT OF USER AGENT INFORMATION

(71) Applicant: Nokia Corporation, Espoo (FI)

(72) Inventor: Yan Fu, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/733,585

(22) Filed: Jan. 3, 2013

(65) Prior Publication Data
US 2013/0124680 A1 May 16, 2013

Related U.S. Application Data

(63) Continuation of application No. 12/626,418, filed on Nov. 25, 2009, now Pat. No. 8,407,351.

(51) Int. Cl.
*G06F 15/16* (2006.01)

(52) U.S. Cl.
USPC ........................................................ 709/228

(58) Field of Classification Search
USPC .................................................. 709/217, 219
See application file for complete search history.

(56) References Cited

U.S. PATENT DOCUMENTS

| | | | |
|---|---|---|---|
| 5,732,219 A * | 3/1998 | Blumer et al. ................ 709/227 | |
| 7,103,681 B2 | 9/2006 | Coulombe | |
| 7,117,227 B2 | 10/2006 | Call | |
| 7,478,146 B2 | 1/2009 | Tervo et al. | |
| 7,536,445 B2 | 5/2009 | Kinoshita | |
| 7,702,317 B2 | 4/2010 | Montelius | |
| 2002/0161745 A1 * | 10/2002 | Call .................................. 707/1 | |
| 2003/0110234 A1 | 6/2003 | Egli et al. | |
| 2003/0167213 A1 * | 9/2003 | Jammes et al. ................ 705/27 | |

(Continued)

FOREIGN PATENT DOCUMENTS

DE 102004003593 A1 8/2005
FR 2918527 A1 1/2009

OTHER PUBLICATIONS

Dennis Bournique, Verizon Using Novarra's Transcoder, Mobile Web Development, Nov. 13, 2008. Accessed: Mar. 18, 2010, http://wapreview.com/blog/?tag=novarra.

(Continued)

*Primary Examiner* — Wing F Chan
*Assistant Examiner* — Andrew Woo
(74) *Attorney, Agent, or Firm* — Ditthavong & Steiner, P.C.

(57) ABSTRACT

Techniques to ensure that user agent information is transported includes determining whether both a type field and a client platform information field are included in a first portion of a uniform resource locator field (URL) of a hypertext transfer protocol (HTTP) request message received from a remote client process. The first portion is different from a domain portion of the URL. The type field holds data that indicates whether the remote client inserted the client information field into a URL of an original HTTP request message. If both the type field and the client platform information field are included, then it is determined, based on data in the type field, whether to include both the type field and the client platform information field in a first portion of a URL in a link in a HTTP response message. The HTTP response message is sent to the remote client process.

20 Claims, 10 Drawing Sheets

(56) References Cited

U.S. PATENT DOCUMENTS

| | | | |
|---|---|---|---|
| 2005/0138137 A1* | 6/2005 | Encarnacion et al. | 709/217 |
| 2007/0088837 A1 | 4/2007 | Gidron et al. | |
| 2007/0208686 A1 | 9/2007 | Gupta et al. | |
| 2008/0201386 A1* | 8/2008 | Maharajh et al. | 707/201 |
| 2009/0089362 A1 | 4/2009 | Zhong et al. | |
| 2009/0106349 A1* | 4/2009 | Harris | 709/203 |
| 2009/0287734 A1* | 11/2009 | Borders | 707/102 |

OTHER PUBLICATIONS

Office Action for related Chinese Patent Application No. 201010563220.X, dated Dec. 21, 2012, pp. 1-7.

Tim Green, Mobile Web Transcoding: Problem Solved? Accessed: Mar. 18, 2010, http://www.mobile-ent.biz/features/176/Mobile-web-transcoding-Problem-solved.

User Agent Switcher. Accessed: Mar. 18, 2010, http://chrispederick.com/work/user-agent-switcher/.

* cited by examiner

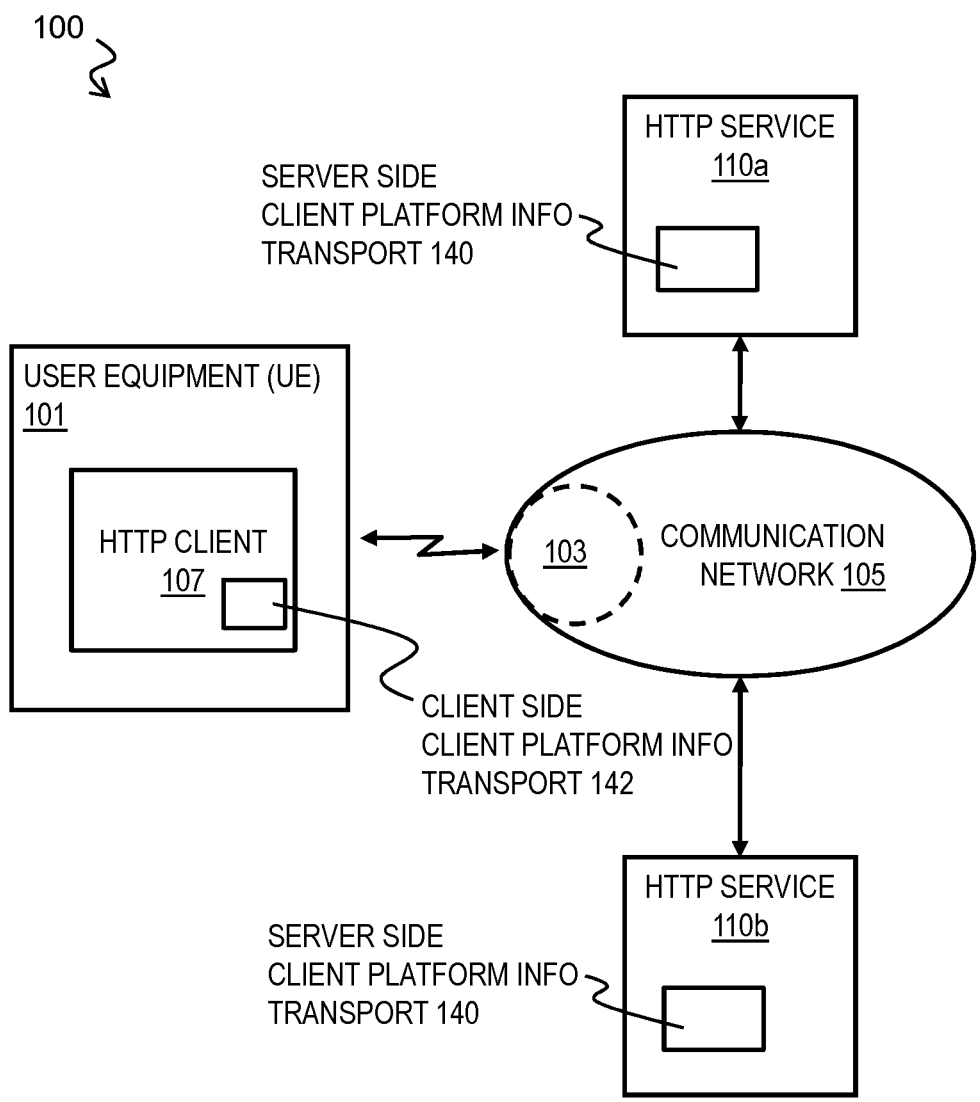

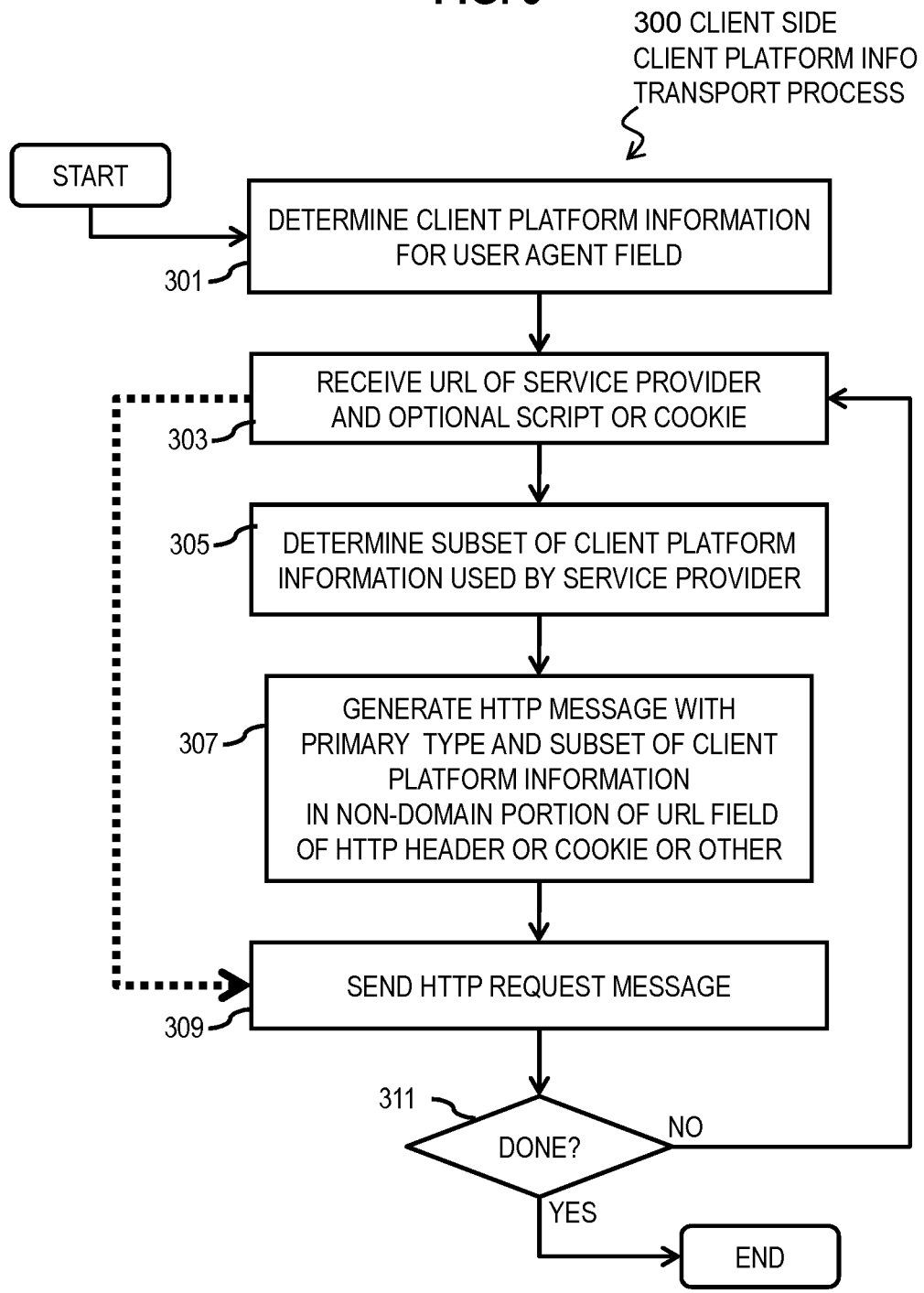

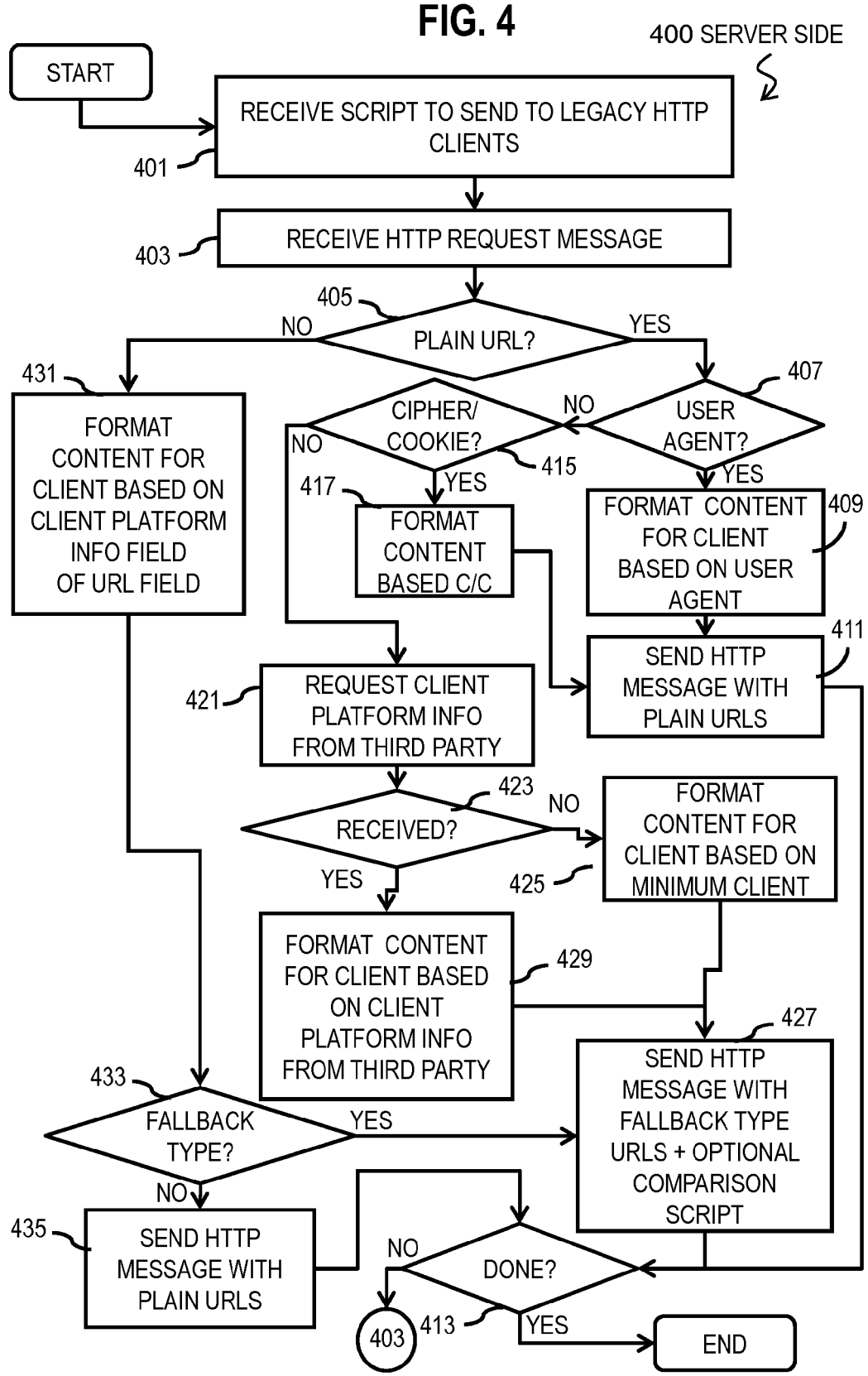

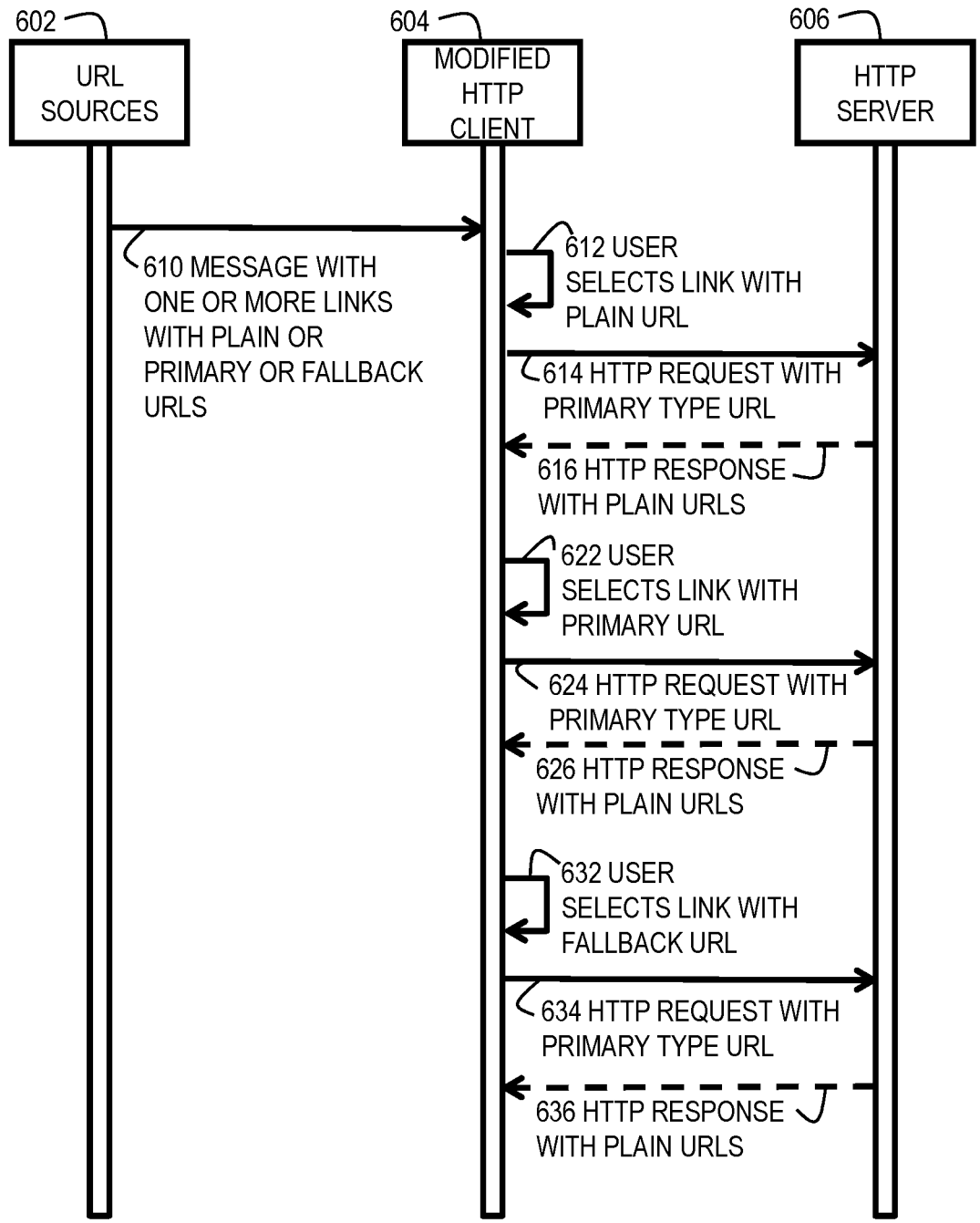

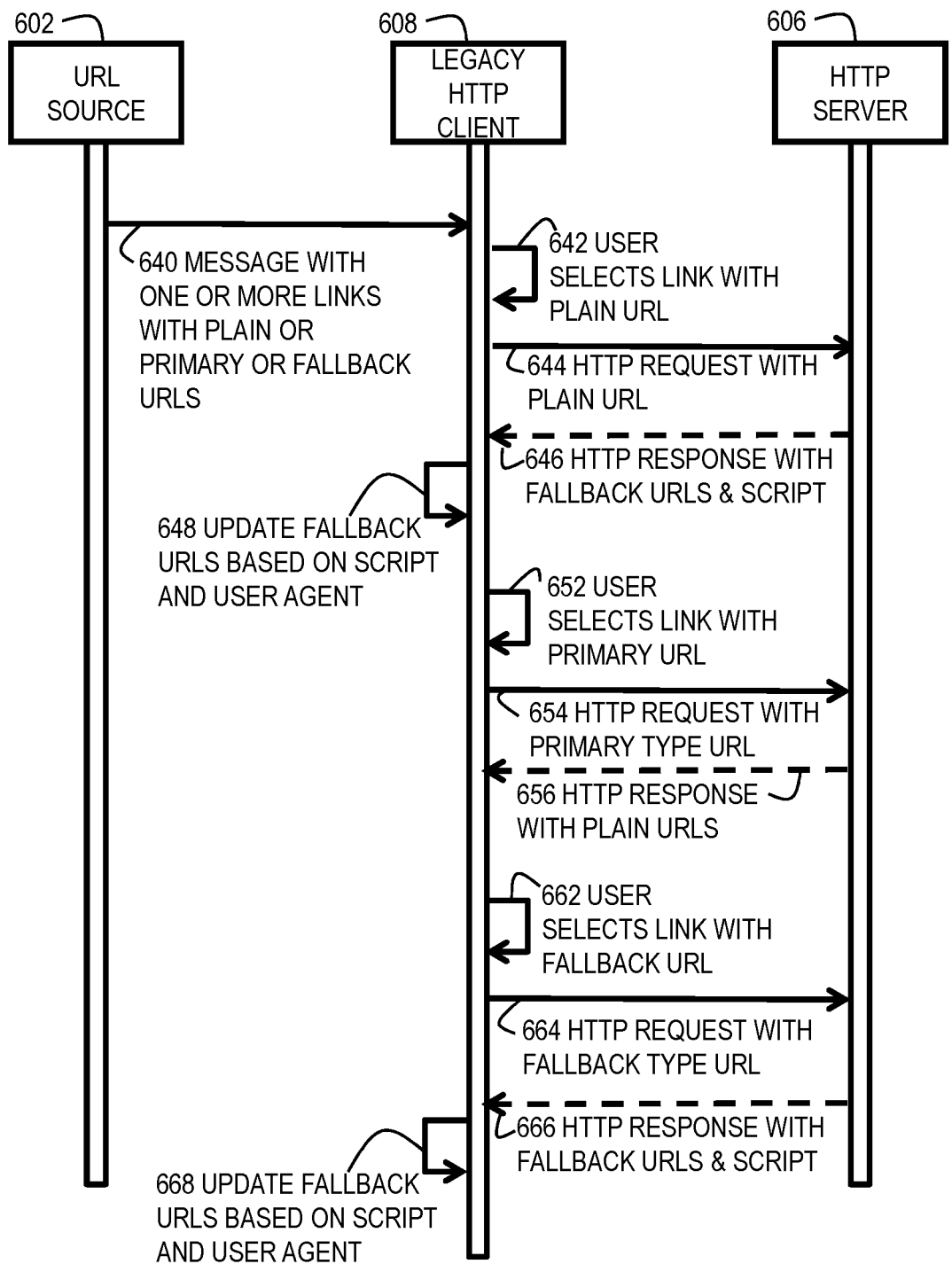

METHOD AND APPARATUS FOR ENSURING TRANSPORT OF USER AGENT INFORMATION

CROSS-REFERENCE TO RELATED APPLICATIONS

This application is a continuation of prior application Ser. No. 12/626,418 filed Nov. 25, 2009, the entirety which is herein incorporated by reference in its entirety.

BACKGROUND

Network service providers and device manufacturers are continually challenged to deliver value and convenience to consumers by, for example, providing compelling network services. One aspect of delivering rich content from network services is to tailor the presentation of that content for the user's device, especially when the user's device is a mobile terminal with limited display area or user input mechanisms or bandwidth, such as a cellular telephone. Much content is delivered to desktop computers using the hypertext transfer protocol (HTTP) for exchanging messages between a service process on the network and a client process on the user's equipment. Desktop computers are highly capable devices often endowed with large display screens, fast network connections, large memories and powerful processors. The content, however, delivered from a service to client should be modified for efficient delivery and effective presentation on a mobile terminal, which often has limited bandwidth or display area or input mechanisms. Thus HTTP allows an HTTP client to indicate the capabilities of the user equipment (such as manufacturer, model number and operating system) in a user agent field of a header portion of the HTTP message. Many network service processes tailor the content of HTTP messages sent to the client process based on the information in the user agent field to improve the user experience of the service, e.g., by making the most relevant or interesting parts of the content more quickly presented and more easily viewed by the user, and discarding or relegating to less accessible areas other information of less relevance or interest.

Recently, some network operators have interjected their own modifications for HTTP messages between client processes on mobile devices and service providers on the network. Using a mechanism called transcoding, these network operators often attempt to request full HTTP content from service providers and reformat that full content for the user's equipment. In general, transcoding changes the HTTP header information, such as the user agent field, sent to the service provider. Thus the user experience is affected by a network operator unaware of the user experience envisioned by the service provider, and some services fail. Many service providers find this undesirable and damaging.

SOME EXAMPLE EMBODIMENTS

Therefore, there is a need for an approach for ensuring transport of user agent information to a service provider even where a network operator alters the user agent field of the HTTP header.

According to one embodiment, a method comprises causing both a type field and a client platform information field to be inserted into a first portion of a uniform resource locator field of a hypertext transfer protocol request message from a local client process. The first portion is different from a domain portion of the uniform resource locator field. The method also comprises causing the hypertext transport protocol message to be sent through a network to a remote service provider addressed by the domain portion. The type field holds data that indicates whether the local client process inserted the client information field into a uniform resource locator field of an original hypertext transfer protocol request message.

According to another embodiment, an apparatus comprising at least one processor, and at least one memory including computer program code, the at least one memory and the computer program code configured to, with the at least one processor, cause, at least in part, the apparatus to cause both a type field and a client platform information field to be inserted into a first portion of a uniform resource locator field of a hypertext transfer protocol request message from the apparatus. The first portion is different from a domain portion of the uniform resource locator field. The apparatus is also caused to send the hypertext transport protocol message through a network to a remote service provider addressed by the domain portion. The type field holds data that indicates whether the apparatus inserted the client information field into a uniform resource locator field of an original hypertext transfer protocol request message.

According to another embodiment, a computer-readable storage medium carrying one or more sequences of one or more instructions which, when executed by one or more processors, cause, at least in part, an apparatus to cause both a type field and a client platform information field to be inserted into a first portion of a uniform resource locator field of a hypertext transfer protocol request message from a local client process. The first portion is different from a domain portion of the uniform resource locator field. The apparatus is also caused to send the hypertext transport protocol message through a network to a remote service provider addressed by the domain portion. The type field holds data that indicates whether the local client process inserted the client information field into a uniform resource locator field of an original hypertext transfer protocol request message.

According to another embodiment, an apparatus comprises means for causing both a type field and a client platform information field to be inserted into a first portion of a uniform resource locator field of a hypertext transfer protocol request message from a local client process, wherein the first portion is different from a domain portion of the uniform resource locator field. The apparatus also comprises means for causing the hypertext transport protocol message to be sent through a network to a remote service provider addressed by the domain portion. The type field holds data that indicates whether the local client process inserted the client information field into a uniform resource locator field of an original hypertext transfer protocol request message.

According to one embodiment, a method comprises facilitating access, including granting access rights, to a service. The service comprises determining whether both a type field and a client platform information field are included in a first portion of a uniform resource locator field of a hypertext transfer protocol request message received from a remote client process. The first portion is different from a domain portion of the uniform resource locator field. The type field holds data that indicates whether the remote client inserted the client information field into a uniform resource locator field of an original hypertext transfer protocol request message. The service also comprises, if both the type field and the client platform information field are included, then determining, based on data in the type field, whether to include both the type field and the client platform information field in a first portion of a uniform resource locator field in a link in a payload section of a hypertext transfer protocol response message. The service further comprises causing the hypertext transfer protocol response message to be sent to the remote client process.

According to another embodiment, an apparatus comprising at least one processor, and at least one memory including computer program code, the at least one memory and the computer program code configured to, with the at least one processor, cause, at least in part, the apparatus to determine whether both a type field and a client platform information field are included in a first portion of a uniform resource locator field of a hypertext transfer protocol request message received from a remote client process. The first portion is different from a domain portion of the uniform resource locator field. The type field holds data that indicates whether the remote client inserted the client information field into a uniform resource locator field of an original hypertext transfer protocol request message. The apparatus is also caused to determine, if both the type field and the client platform information field are included, based on data in the type field, whether to include both the type field and the client platform information field in a first portion of a uniform resource locator field in a link in a payload section of a hypertext transfer protocol response message. The apparatus is further caused to send the hypertext transfer protocol response message to the remote client process.

According to another embodiment, a computer-readable storage medium carrying one or more sequences of one or more instructions which, when executed by one or more processors, cause, at least in part, an apparatus to determine whether both a type field and a client platform information field are included in a first portion of a uniform resource locator field of a hypertext transfer protocol request message received from a remote client process. The first portion is different from a domain portion of the uniform resource locator field. The type field holds data that indicates whether the remote client inserted the client information field into a uniform resource locator field of an original hypertext transfer protocol request message. The apparatus is also caused to determine, if both the type field and the client platform information field are included, based on data in the type field, whether to include both the type field and the client platform information field in a first portion of a uniform resource locator field in a link in a payload section of a hypertext transfer protocol response message. The apparatus is further caused to send the hypertext transfer protocol response message to the remote client process.

According to another embodiment, an apparatus comprises means for determining whether both a type field and a client platform information field are included in a first portion of a uniform resource locator field of a hypertext transfer protocol request message received from a remote client process. The first portion is different from a domain portion of the uniform resource locator field. the type field holds data that indicates whether the remote client inserted the client information field into a uniform resource locator field of an original hypertext transfer protocol request message. The apparatus also comprises means for determining, if both the type field and the client platform information field are included, based on data in the type field, whether to include both the type field and the client platform information field in a first portion of a uniform resource locator field in a link in a payload section of a hypertext transfer protocol response message. The apparatus further comprises means for sending the hypertext transfer protocol response message to the remote client process.

According to another embodiment, a method comprises including a cookie with user agent information in a hypertext transfer protocol request message. According to another embodiment, a method comprises including a user-proprietary hypertext transfer protocol header field with user agent information in a hypertext transfer protocol request message. According to another embodiment, a method comprises including an encrypted hypertext transfer protocol header field with user agent information in a hypertext transfer protocol request message.

According to various other embodiments, a computer-readable storage medium carrying one or more sequences of one or more instructions which, when executed by one or more processors, cause, at least in part, an apparatus to perform one or more steps of the latter three methods. According to various other embodiments, an apparatus comprises means for performing one or more steps of the latter three methods. According to various other embodiments, an apparatus comprises at least one processor, and at least one memory including computer program code, the at least one memory and the computer program code configured to, with the at least one processor, cause, at least in part, the apparatus to perform one or more steps of the last three methods.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a system capable of ensuring transport of user agent information to a service provider, according to one embodiment;

FIG. 3 is a flowchart of a client process for ensuring transport of user agent information to a service provider, according to one embodiment;

FIG. 4 is a flowchart of a server process for ensuring transport of user agent information to a service provider, according to one embodiment;

FIGS. 6A through 6B are time sequence diagrams of messages exchanged for transport of client platform information outside of user agent fields, according to various embodiments;

DESCRIPTION OF SOME EMBODIMENTS

Figure 2A:
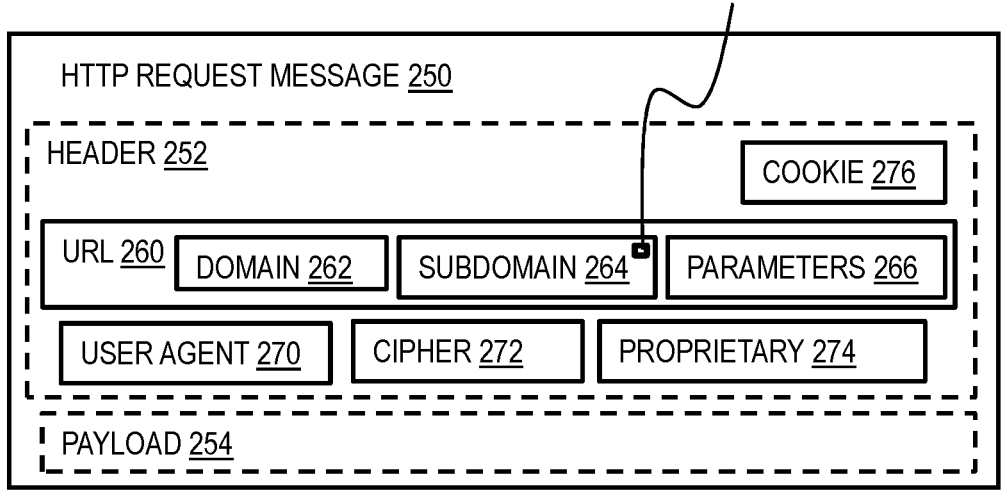
FIG. 2A is a diagram of the component fields of a hypertext transfer protocol (HTTP) request message with extra client platform information, according to one embodiment.

Examples of a method, apparatus, and computer program for ensuring transport of user agent information to a service provider are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. A well known client process available on most nodes connected to a communications network is a World Wide Web client (called a "web browser," or simply "browser") that interacts through messages formatted according to the hypertext transfer protocol (HTTP) with any of a large number of servers called World Wide Web servers that provide web pages.

As used herein, the term "client platform" refers to the hardware and software environment in which a client process operates, as well as information about the type of client such as the manufacturer and model of the device, the equipment options, the operating system, whether the client process is a browser or some other application, and other software options with which a client process interacts. The client platform determines the display screen and hardware and software controls for a user to interact with the client process and the type of information to send to, or expect from, the client process. Client platform information includes data that describes some or all of the client platform. The term "user agent" refers to a field in a hypertext transfer protocol (HTTP) header that is often used to send client platform information from a client process to a server process.

Although various embodiments are described with respect to HTTP messages exchanged between a browser and a World Wide Web server, it is contemplated that the approach described herein may be used with other clients and servers that interact via HTTP, either as standalone applications or as software objects, such as widgets, embedded in other applications. A software object is a data structure that includes data that describes the state of a process that executes on a processor and includes instructions for exchanging data with or changing the state of the process. A widget is a software object with a graphical user interface for interacting with a human user of a device and often with an application programming interface for interacting with a backend process on a remote network node.

FIG. 1 is a diagram of a system 100 capable of ensuring transport of user agent information to a service provider, according to one embodiment. Many mobile terminals achieve access to a network by subscribing to a network operator, such as a cellular telephone service provider. As described above, for various reasons, some of these network providers interfere with the client platform information inserted by a client into a user agent field of an HTTP header. Consequently, the client platform information originally inserted into the user agent field is not reliably transported to a server provided by a service provider, such as a social network service provider, which may be different from and independent of the network operator. The server is thus unable to properly format the server content for the client platform of the client process. This can lead to a poor user experience and retaliation against the service provider, including complaints from users and loss of users. Thus there is a need to ensure transport of user agent information even when a network operator changes or deletes the user agent field in an HTTP message.

To address this problem, a system 100 of FIG. 1 introduces the capability to insert at least some client platform information into other portions of the HTTP message, such as the uniform resource locator (URL) field, which are not altered by the network operator. In some embodiments, this client platform information is inserted into a cookie stored at a user device and transmitted to the server with a request. In some embodiments, this client platform information is inserted into a proprietary HTTP header field, such as a cipher that contains encrypted data that can be de-ciphered by the server, but not by the network operator. In the embodiments illustrated below, the system 100 can work with a modified HTTP client that actively introduces the client platform information into the URL in the HTTP header, or with a legacy HTTP client that passively uses URLs with client platform information already included.

As shown in FIG. 1, the system 100 comprises user equipment (UE) 101 having connectivity to a first HTTP service 110a and a second HTTP service 110b via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like. At least a portion 103 of communications network 105 is operated by a network operator which provides mobile network access for UE 101.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.). In the illustrated embodiment, the UE 101 is a mobile terminal, as described in more detail below with reference to FIG. 9, connected to network provider portion 103 of communications network 105 by a wireless link.

By way of example, an HTTP client 107, such as a browser on the UE 101, and HTTP services 110*a* and 110*b* communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

According to the illustrated embodiment, the HTTP services 110*a* and 110*b* each includes a server side client platform information transport process 140 to ensure that client platform information is transported from HTTP client 107 even if the user agent field of the HTTP header is changed or removed in the network operator portion 103 of the communications network 105. In the illustrated embodiment, the HTTP client 107 includes a client side user platform information transport process 142. In other embodiments, a legacy HTTP client process is used and client side client platform information transport process 142 is omitted. It is contemplated that the functions of these processes may be performed by a chip set, computer, or mobile terminal and may be combined in one or more processes or performed by other components of equivalent functionality.

FIG. 2A is a diagram of the components of a hypertext transfer protocol (HTTP) request message 250 with extra client platform information 202, according to one embodiment. The standard HTTP fields are defined in a HTTP specification promulgated on the internet by the Internet Engineering task force (IETF). An HTTP message is included in one or more data packets routed through a network (e.g., network 105) based on one or more lower layer protocols that encapsulate the HTTP message. The HTTP request message includes a header portion 252 and a payload portion. The header portion 252 includes: a URL field 260 that is used to identify the destination of the message; a user agent field 270: and zero or more optional cipher fields 272 to hold encrypted header information, such as a digital signature; and zero or more optional proprietary header fields 274 defined by a particular network application; and zero or more optional cookie fields 276. Contents for cookie field 276 were generated by the client using a set cookie field of a previous HTTP response message sent to the client. Other fields of header 252 that are not relevant to this embodiment are not shown to avoid obscuring the operation of the processes.

The URL field 260 includes a domain field 262 that identifies the network node on which the destination of the message operates e.g., node.com and often the type of process that is operating on that node, such as a World Wide Web server (e.g., appending www. before node.com) or image (e.g., node.com/imagejpg) or other application. The optional subdomain field 264 holds data that indicates a directory on the network node where the process to receive the message resides, if not at the highest level of the node, e.g., /topdirectoryname/lowerdirectorynam/deepestdirectoryname/filename. If the filename is left off, the web server on the destination node assumes an index file in the deepest directory. If one is absent, the link is broken and the network node sending the message is notified of an error.

In some cases, the process that receives the message operates differently based on the values of one or more query parameters used by the receiving process. Values for such parameters are provided in the parameters field 266 of the URL, starting with a question mark, e.g., ?first=1234 & second=12#$%.

The user agent field 270 holds data that indicates at least some of the client platform information. The User-Agent request header field contains information about the client platform (called the user agent in the HTTP specification) originating the request. This information is used for zero or more of a variety of purposes, including statistical purposes, the tracing of protocol violations, and automated recognition of client platforms for the sake of tailoring responses to avoid particular platform limitations. The user agent field is optional and should be included with HTTP request but not with HTTP responses. The field can contain multiple product tokens and comments identifying the client platform and any subproducts which form a significant part of the client platform. By convention, the product tokens are listed in order of their significance for the destination server process. Product tokens are used to allow communicating applications to identify themselves by software name and version. Most fields using product tokens also allow sub-products which form a significant part of the application to be listed, separated by white space. Comments can be included in some HTTP header fields by surrounding the comment text with parentheses. Comments are only allowed in fields containing "comment" as part of their field value definition. In all other fields, parentheses are considered part of the field value. A string of text is parsed as a single word if it is quoted using double-quotation marks. The backslash character ("\") may be used as a single-character quoting mechanism only within quoted-string and comment constructs.

Example contents of a user agent field for purposes of illustration are given by the following string 1:

Mozilla/5.0 (SymbianOS/9.2; U; Series60/3.1
      NokiaN95/10.0.010; Profile/MIDP-2.0 Configu-
      ration/CLDC-1.1) AppleWebKit/413 (KHTML,
      like Gecko) Safari/413                                    (1)

These contents indicate that the sending process is a browser that is compatible with Mozilla/5.0, AppleWebKit/413 and Safari/413, in the order of significance. Comments are in the brackets and are used to indicate further features of the client platform. SymbainOS/9.2 and Series60/3.1 indicate the operating systems and versions. NokiaN95/10.0.010 indicates the device model and ROM version. Profile/MIDP-2.0 and Configuration/CLDC-1.1 indicates that the device is able to execute Java software.

The payload portion 254 of the HTTP request message 250 is empty for a GET request, but can include data for a POST request.

According to various embodiments, at least some client platform information is included in a client platform information field in one of the HTTP fields other than the user agent field 270. For example, client platform information 202 is included in a client information field in subdomain field 264 as depicted in FIG. 2A. In other embodiments, client platform information is included in parameters field 266, or cipher field 272 or proprietary header field 274 or cookie field 276, or some combination. Only one embodiment is depicted to emphasize that all the client information of interest can be inserted in a single field. In some embodiments, the client platform information is not inserted in the domain field 262 to avoid interfering with delivering the request message 250 with the correct network node.

A challenge to inserting client platform information in these fields is to make the change backward compatible with legacy HTTP clients, such as legacy browsers. For example, if a user with cell phone model N95 forwards a URL with client platform information to another user with cell phone model E90, the second user may view content that is not optimized for the device of the second user. This is called the link forwarding/sharing problem. Furthermore, this method does not work when the first URL is manually entered. For example, a user can enter plain URLs on a browser and server will have difficulty figuring out what client platform information to add. This is called the starting phase problem.

In some embodiments, backward compatibility is approximated by using one of the URL fields and including a type field in addition to the client platform information field. The type field indicates whether a modified or legacy client sent the request. A modified HTTP client can send the information with no help from the HTTP server. However, a legacy HTTP client uses some help from the HTTP server, as described in more detail below. URLs from modified HTTP clients have a type value called "primary" or type A; and URLs from legacy HTTP clients have a type value called "fallback" or type B. Thus, the type field holds data that indicates whether the client process inserted the client information field into a URL field of an original HTTP request message as done by a modified HTTP client. A legacy HTTP client does not insert the client information field into the URL field of the original HTTP request message, but relies on the server to cause that field to be inserted before or after the original request message, as described below.

Figure 2B:
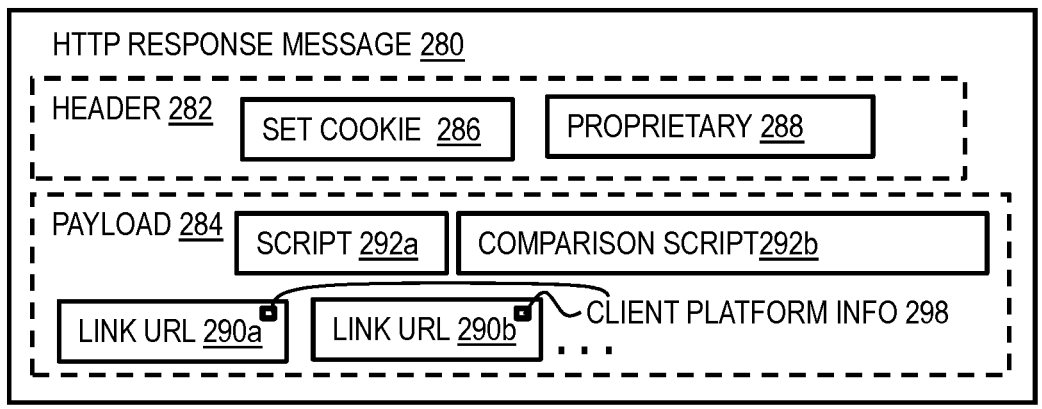
FIG. 2B is a diagram of the component fields of a HTTP response message with extra client platform information, according to one embodiment.

FIG. 2B is a diagram of the components of a HTTP response message 280 with extra client platform information 292, according to one embodiment. The response message 280 includes a header portion 282 and a payload portion 284. The header portion 282 includes zero or more optional set cookie fields 286 and zero or more optional proprietary header fields 288. A set cookie field 286 holds data that indicates information to be returned in a cookie field 276 of subsequent request messages from the client process that receives this response message.

The payload portion 284 of the HTTP response message 280 holds contents to be presented on the user equipment by the HTTP client and includes text or images, not shown, or both. Links to other servers with related services may also be included, such as depicted link URLs 290a, 290b and others indicated by the ellipsis. Scripts may also be included to aid interactions with the user, such as forms, by providing instructions to be executed by the HTTP client or a script engine plugged into the HTTP client, such as a Javascript engine or ActiveX engine. Script 292a and comparison script 292b are depicted. The functionality provided by comparison script 292b is described in more detail below with reference to FIG. 6B.

According to some embodiments, client platform information 298 is included in link URLs included in HTTP response messages sent to legacy HTTP clients, or a client platform information script 292b is included, or both. In some other embodiments, client platform information 298 is included in the set cookie field 286 in HTTP response messages sent to legacy HTTP clients. In many embodiments, such client platform information 298 is not sent to modified HTTP clients.

In some other embodiments, client platform information 298 is included in the proprietary header field 288 in HTTP response messages sent to HTTP clients that are not legacy HTTP clients but modified clients that use the proprietary header field 288 for this purpose.

Figure 2C:
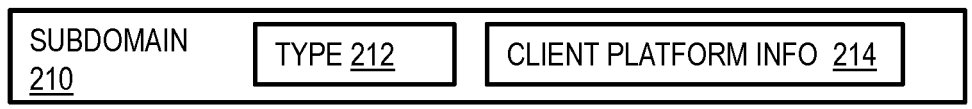
FIG. 2C and FIG. 2D are diagrams that illustrate alternative ways to include client platform information in a URL in a HTTP message, according to various embodiments.
Figure 2D:
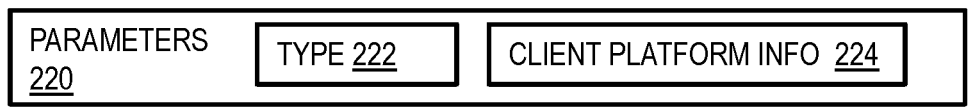

FIG. 2C and FIG. 2D are diagrams that illustrate alternative ways to include client platform information in a URL in a HTTP message, according to various embodiments. FIG. 2C shows a type field 212 and client platform information field 214 inserted into a subdomain field 210 in a URL of a HTTP message, whether in the header 252 portion of a request message or a link URL in a payload portion 284 of a response message. For example, to indicate Mozilla 5.0 compatibility and device NokiaN95 and operating system SymbianOS 9.2 in subdomain field 264, the following string 2

/Mozilla/5.0/NokiaN95/10.0.010/SymbianOS/9.2/                (2)

can be inserted as the client platform information field 214 in the subdomain field 210 after the actual subdomain, if any. In other embodiments, more or less information is included in the client platform information field, or different information is included. For example, Web servers have less interest in operating system and more in browser version and device model, so the string "SymbianOS/9.2" can be omitted. In some embodiments, a well-known list for most popular user agent strings is defined, and only the index for corresponding user agent string in this list is inserted in the client platform information field. If the URL is in a request header formed by a modified HTTP client, then the type field 212 indicates the primary (type A) value. If the URL is in a response payload formed by a HTTP server, then the type field 212 indicates the fallback (type B) value. Including both type field and client platform information field, the subdomain field 210 has a string that looks like string 3a or 3b.

/type=A/Mozilla/5.0/NokiaN95/10.0.010/SymbianOS/
      9.2/                                                      (3a)

/type=B/Mozilla/5.0/NokiaN95/10.0.010/SymbianOS/
    9.2/    (3b)

FIG. 2D shows a type field 222 and client platform information field 224 inserted into a parameters field 220 in a URL of a HTTP message, whether in the header 252 portion of a request message or a link URL in a payload 284 of a response message. For example, to indicate the same client platform information in the parameters field 266, the following string 4

?Mozilla=5.0&device=NokiaN95/
    10.0.010&OS=SymbianOS/9.2    (4)

can be inserted as the client platform information field 224 into the parameters field 220. In other embodiments, more or less information is included in the client platform information field, or different information is included, as described above. If the URL is in a request header formed by a modified HTTP client, then the type field 222 indicates the primary (type A) value. If the URL is in a response payload formed by a HTTP server, then the type field 222 indicates the fallback (type B) value. Including both type field and client platform information field, the parameters field 220 has a string that looks like string 5a or 5b.

?type=A&Mozilla=5.0&device=NokiaN95/
    10.0.010&OS=SymbianOS/9.2    (5a)

?type=B&Mozilla=5.0&device=NokiaN95/
    10.0.010&OS=SymbianOS/9.2    (5b)

Although messages and fields are shown as integral blocks in a particular order for purposes of illustration, in other embodiments one or more messages or fields, or portions thereof, may be combined or separated or occur in a different order.

FIG. 3 is a flowchart of a client process 300 for ensuring transport of user agent information to a service provider, according to one embodiment. Although steps are shown in FIG. 3 and subsequent flowchart FIG. 4 in a particular order for purposes of illustration, in other embodiments, one or more steps or portions thereof are performed in a different order or overlapping in time, executed in series or parallel, or one or more steps or portions thereof are omitted or one or more additional steps are added, or the process is changed in some combination of ways.

Figure 7:
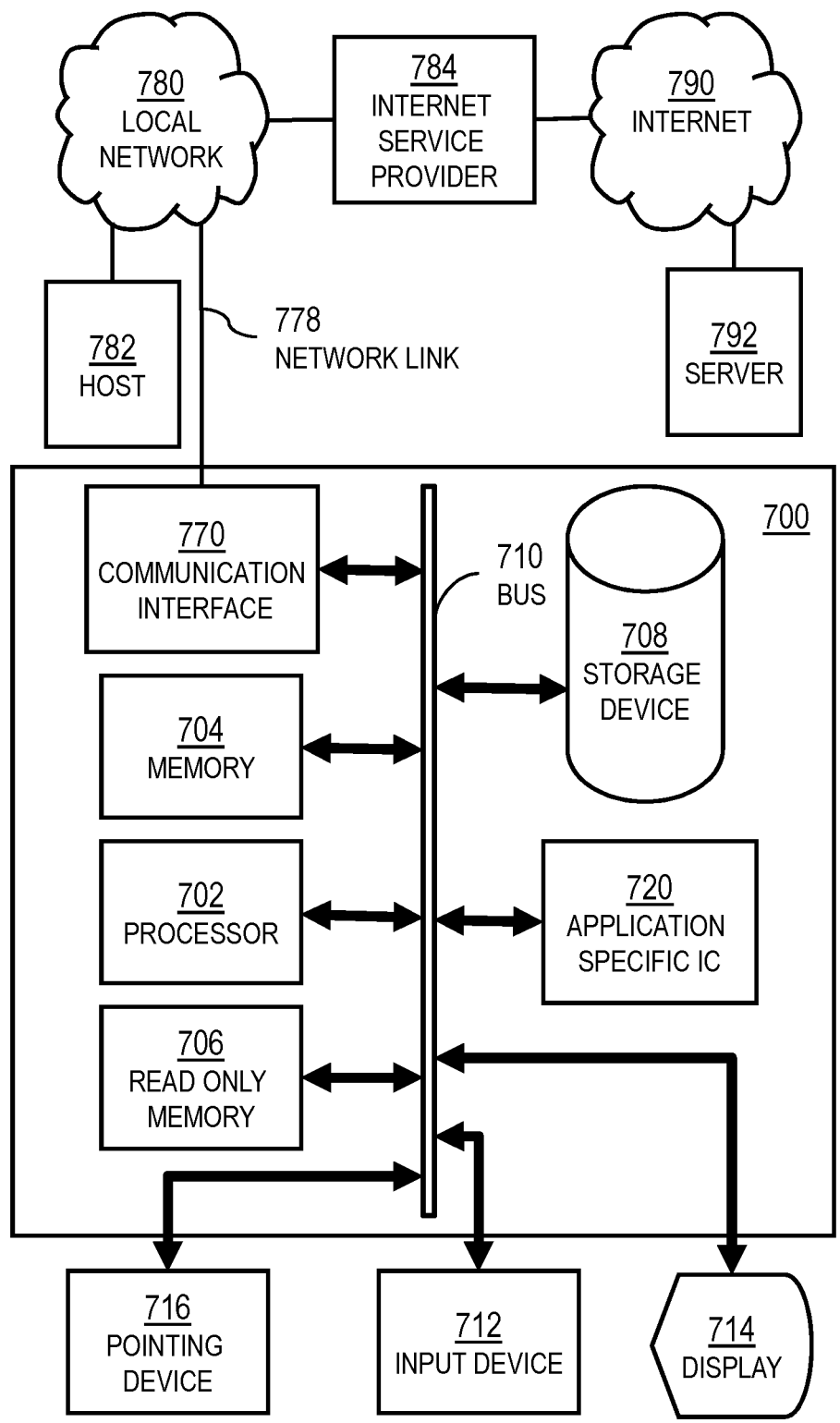
FIG. 7 is a diagram of hardware that can be used to implement an embodiment of the invention.
Figure 8:
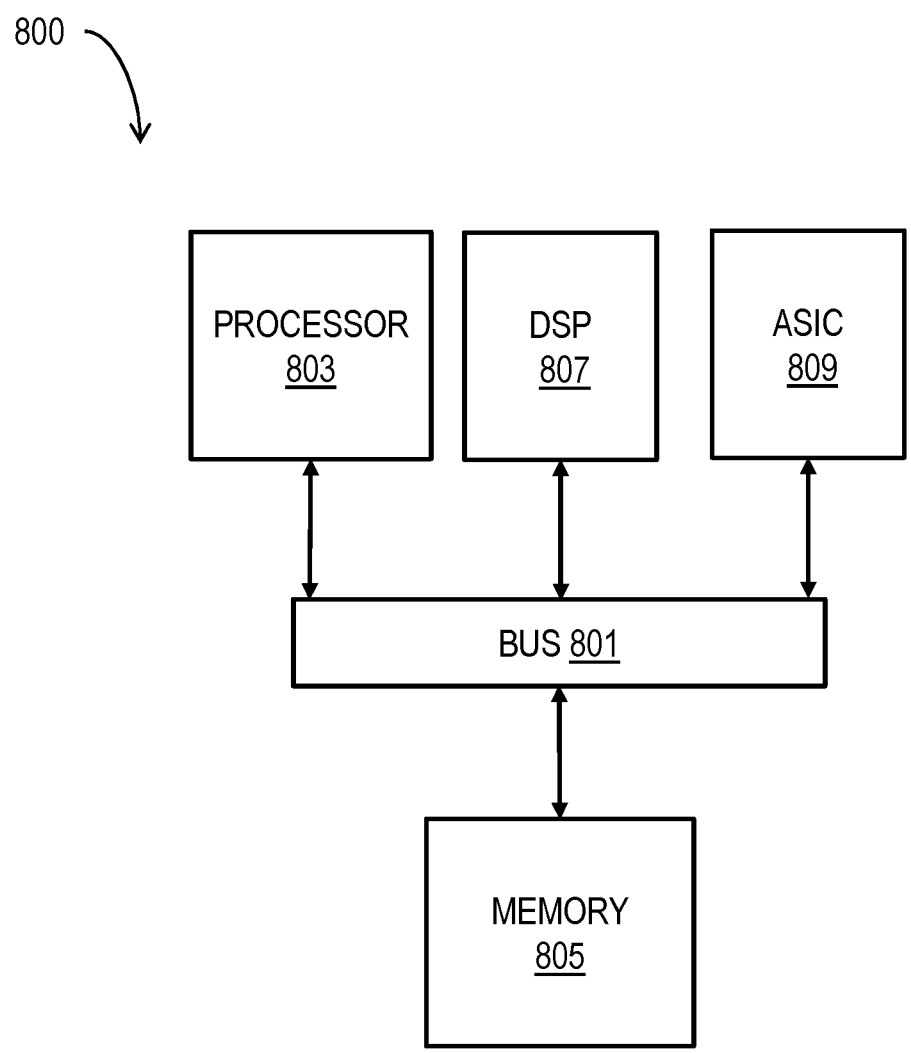
FIG. 8 is a diagram of a chip set that can be used to implement an embodiment of the invention.
Figure 9:
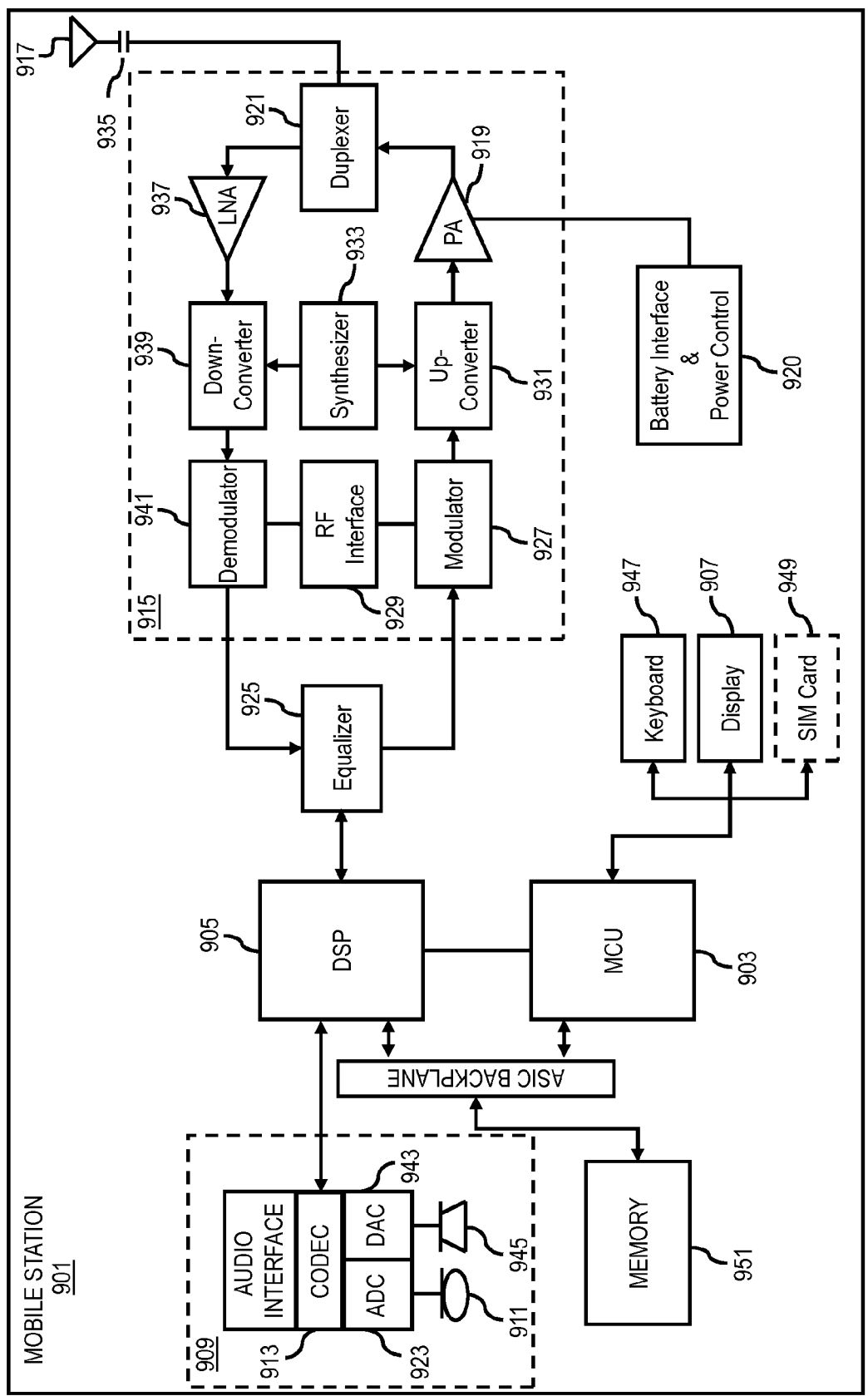
FIG. 9 is a diagram of a mobile terminal (e.g., handset) that can be used to implement an embodiment of the invention.

In one embodiment, the client side client platform information transport process 142 in modified HTTP client 107 performs the process 300 and is implemented in, for instance, a chip set including a processor and a memory as shown FIG. 8, or as part of mobile terminal shown in FIG. 9, or both. In another embodiment, a legacy HTTP client performs a subset of the steps depicted in FIG. 3 and is implemented in, for instance, a chip set including a processor and a memory as shown FIG. 8, or as part of mobile terminal shown in FIG. 9, or as a computer as shown FIG. 7.

In step 301, the client platform information is determined for the user agent field. This step is routinely practiced by most HTTP clients that send a HTTP request message, and is well known in the art. For purposes of illustration, it is assumed that the client platform information is the same as used to form the example user agent string 1, recited above.

In step 303 a URL of a service provided on the network by a service provider is received, e.g., as link in a previous HTTP response message (such as a web page or widget), email, document, instant message, or as manual input from a user of the equipment (e.g., UE 101) where the client is executing.

A legacy HTTP client then jumps to step 309 as indicated by the dotted line, where an HTTP request message 250 is sent with the URL as received in the URL field 260 and the user agent string in the user agent field 270. The request 250 is subject to loss of user agent field 270 information by a service provider, e.g., by network operator of network portion 103. If client platform information 202 is included in the URL received and placed in field 260, then the server will rely on that information if the user agent field 270 is missing or detected to be altered. If client platform information 202 is not included in the URL received and placed in field 260, then the server will not know the client platform information, if the user agent field 270 is missing or detected to be altered. As described in more detail below, in an illustrated embodiment, link URLs sent to legacy HTTP clients include client platform information fields and type fields with the fallback value.

If the URL is received in step 303 in an HTTP response message that includes a script, then the script is executed before or during step 303. If the script instructs the client to include at least some client platform information from the user agent information into the request header (e.g., URL field 260, or proprietary header field 274 or cipher field 272), then the server will rely on that information if the user agent field 270 is missing or detected to be altered.

Similarly, if the URL is received in step 303 in an HTTP response message that includes a set cookie field 266 that indicates cookie parameters are to be set to one or more user agent parameters, then before or during step 303 the HTTP request 250 will include a cookie field 276 with client platform information; and, the server will rely on that information if the user agent field 270 is missing or detected to be altered.

It is noted, however, that some URLs are received outside of a HTTP response message, e.g., as a link in an email, instant message, document, or are input manually. In such cases there is neither script nor cookie to rescue the client platform information in the user agent field 270 from alteration by a network provider.

After step 309, it is determined in step 311 whether the client is done. If not done, e.g., because another URL is received within a prescribed time interval, then control passes back to step 303 to receive the next URL. Otherwise the client process ends.

A modified HTTP client with client side client platform information transport process 142 also performs one or more of steps 305 or 307 before sending the HTTP request message in step 309.

In step 305, a subset is determined of the client platform information used for the user agent field. The subset is used by the service indicated by the URL selected in step 303. For example, if the service is a web server, the browser compatibility and device model and version are all that are desired in the subset. However, if certain operating system functions are to be utilized by the service, then the operating system information is also desired. Any method may be used to determine this subset. In various embodiments, data indicating the subset is included as a default value in software instructions, is received as manual input from an administrator on the local or a remote node, is retrieved from a local file or database, or is sent from a different node on the network, either in response to a query or unsolicited, or the data is received using some combination of these methods.

In step 307, the HTTP message is generated with the subset of client platform information in a field different from the user agent. In some embodiments, the subset of client platform information is included in a cookie formatted for the service even if the URL was not received in an HTTP response with a set cookie field. Similarly, the subset of client platform information is included in a cipher field or proprietary header field even if the URL was not received in an HTTP response with script to produce those fields.

In an illustrated embodiment, the subset of client platform information is included in the client platform information field 214 or 224 of the URL field 260 and the primary value is included in the type field 212 or 222 of the URL field 260 to indicate that a modified HTTP client produced the URL and inserted it in the original HTTP request message sent to the service. An advantage of this approach is that fewer resources are consumed and shorter delays are incurred than in embodiments relying on executing special scripts to add additional fields to the HTTP header for every URL or storing and adding cookies to every HTTP request. Both cookies and scripts typically involve two HTTP request messages to the service, plus an additional response and processing time on the client side. Using URLs enable the desired client platform information to be conveyed in the first HTTP request message. In this embodiment, the original HTTP request message sent by the modified HTTP client is the same as the current HTTP request message sent by the modified HTTP client.

A type A URL (also called a primary URL) includes a client platform information field 214 or 224 and a type field 212 or 222 with a primary value in the type field. A type B URL (also called a fallback URL) includes a client platform information field 214 or 224 and a type field 212 or 222 with a fallback value in the type field. A plain URL is a URL without type fields or client platform information fields. Thus, in the illustrated embodiment, a modified HTTP client always includes a type A URL in the HTTP header during step 307, whether the URL received in step 303 is a Plain URL, a type A URL or a type B URL. The HTTP request message is then sent in step 309.

FIG. 4 is a flowchart of a server process 400 for ensuring transport of user agent information to a service provider, according to one embodiment. In one embodiment, the server side client platform information transport process 140 in service 110a or service 110b performs the process 400 and is implemented in, for instance, a chip set including a processor and a memory as shown FIG. 8, or as computer system shown in FIG. 7, or both. This process 400 enhances transport of the client platform information for both modified and legacy HTTP clients. Steps are included for passing client platform information with legacy HTTP clients via cookie or script, the latter using URL fields or cipher fields or proprietary header fields. In some embodiments including such steps, steps related to modifying URLs are omitted. In an illustrated embodiment using only URLs, steps related to cookies, ciphers and proprietary header fields are omitted.

In step 401 script is received that will be sent to legacy HTTP clients, at least. Any method may be used to receive such script, for example, as described above for subset definitions. Various scripts can be used, including scripts to insert client platform information into cipher or proprietary header fields or URLs. In an illustrated embodiment, a comparison script to compare user agent data to, and update, a client platform information field sent from the server to the legacy client, as described in more detail below, is received in step 401.

In step 403 an HTTP request message (e.g., message 250) is received. In step 405, it is determined whether the URL field (e.g., field 260) is formatted as a plain URL (e.g., without type and client platform information fields). If so, then this request is not from a modified HTTP client using the URL field 260 to convey client platform information, and control passes to step 407.

In step 407, it is determined whether the user agent field (e.g., field 270) is present (and not detectably altered). If so, then the information in the user agent field is relied upon; and in step 409 the content of the HTTP payload is formatted for the HTTP client based on the information in the user agent field, either directly or indirectly by means of an index. For example, the text and images are rearranged for the small display screen of a mobile phone indicated by the data in the user agent field. Any links in the content are formatted as plain URLs, because the network operator appears to be leaving the user agent field alone.

In step 411 the HTTP response message is sent to the client with link URLs that are plain URLs without client platform information. In step 413 it is determined whether the server side process is done, e.g., because the service is going offline or this instance of the server has not received any HTTP request messages for a certain time duration. If not done, control passes back to step 403 to receive the nest HTTP request message. Otherwise, the process ends.

If it is determined in step 407 that the user agent field is absent or detectably altered, then it is determined in step 415 whether a cipher or proprietary header or cookie field carries client platform information. If so, then, in step 417, the content of the HTTP payload is formatted for the HTTP client based on the information in the cipher or proprietary header or cookie field, either directly or indirectly by means of an index. Any links in the content are formatted as plain URLs because the client is not using URLs to convey client platform information. The content includes any scripts to send to legacy HTTP clients to cause those clients to use the corresponding cipher or proprietary header or cookie field to convey at least a subset of the client platform information for the user agent field. Control then passes to steps 411 and following, as described above to send the HTTP response message and receive the next HTTP request message. In the illustrated embodiment using URLs to convey client platform information, steps 415 and 417 are omitted.

In some embodiment using a cipher or proprietary header or cookie to convey client platform information, step 415 includes sending an HTTP response to the HTTP client if the original HTTP request does not include a cipher or proprietary header or cookie field that carries client platform information. In this case, the HTTP client is assumed to be a legacy HTTP client, and the HTTP response includes a set cookie or script that causes the legacy HTTP client to insert the desired client platform information into the corresponding cipher or proprietary header or cookie field. The second request from the client should then include the desired client platform information in the corresponding field. A modified HTTP client would automatically have sent the desired client platform information in the corresponding field.

If it is determined in step 415 that neither a cipher nor proprietary header nor cookie field carries client platform information, or if step 415 is omitted, then in step 421 an attempt is made to request client platform information from a third party. Many network operators that strip or alter the user agent field provide a third party service for supplying the original user agent information. Employing that service adds delay and consumption of network resources and is undesirable for every HTTP request issued by a client. For example the HTTP client is redirected to the third party service which adds the data from the original user agent field in a different field or a new user agent field and then the HTTP client is redirected back to the server executing process 400, adding two redirect response messages and two requests. However, in some embodiments the third party service is invoked for the first HTTP request message received from a legacy HTTP client, during step 421.

In some embodiments, step 421 includes redirecting the client to a secure HTTP server using the HTTPS protocol instead of or in addition to redirecting the client to the third party service. HTTPS encrypts some fields. Network operators do not alter the header fields of HTTPS messages, and thus the user agent field arrives at the HTTPS service unaltered. That service can add the client platform information to a cookie, a cipher field, the proprietary field or the URL and then redirect the client back to the original service, e.g., service 110*a*. The redirected HTTP request now includes the desired client platform information in the corresponding field. This step offers the advantage that it can be made to work even if a third party service is not available. It does require two additional redirects, like the third party service.

In step 423, it is determined whether the client platform information is received from the third party service or HTTPS service. If not, then in step 425 the content is formatted based on a minimum client capability, to ensure that it can be presented in any mobile device. In some embodiments, step 425 includes any scripts to cause the legacy HTTP client to update the minimum assumed client platform information. In embodiments using URLs to convey desired client platform information, any link URLs are written as type B (fallback) URLs with the assumed values for the client platform.

In step 427 the HTTP response message with type B (fallback) URLs comprising server initiated client platform information fields, and with optional comparison script to compare and update the server initiated client platform information, is sent to the client. By executing the comparison script, the HTTP client process is considered to have not originally inserted the client information field into the URL of the original HTTP request message. Server initiated client platform information, as used herein, includes assumed platform values, values returned from the third party or HTTPS service, and values returned from legacy HTTP clients executing server provided scripts, such as comparison script indicated in step 427. Control then passes to step 413 and following as described above.

If it is determined, in step 423, that the client platform information is received from the third party service or from the HTTPS service, then, in step 429, the content is formatted based on the user agent data received. In some embodiments, step 429 includes any scripts to cause the legacy HTTP client to update the received client platform information. In embodiments using URLs to convey desired client platform information, any link URLs are written as type B (fallback) URLs with the third party provided client platform information. Control passes to step 427 and following, described above.

If it is determined, in step 405, that the HTTP request message does not have a plain URL, e.g., has a type A URL or type B URL, then URLs are used to convey client platform information and the request was either sent by a modified HTTP client with a client side client platform information transport process 142, or sent by a legacy HTTP client following a link URL produced by a server side client platform information transport process 140 (e.g., in step 427).

In step 431, the content of the HTTP payload is formatted for the HTTP client based on the information in the client platform information field of the URL field 260, either directly or indirectly by means of an index. For example, the text and images are rearranged for the small display screen of a mobile phone indicated by the data in the client platform information field 224 of the parameters field 220 of the URL field.

In step 433, it is determined whether the type field indicates a fallback value (type B). If so, any link URLs are written as type B URLs. The HTTP response message with fallback type URLs and optional comparison script is sent in step 427 and following, as described above.

If it is determined, in step 433, that the type field indicates a primary value (type A), then any link URLs are written as plain URLs because the modified HTTP client does not rely on the client platform properties received from a server. Type A or type B URLs could also be written, but these types are ignored by the modified HTTP client and it is advantageous to reduce the number of characters used to indicate the URLs. In step 413, it is determined if the server process is done, as described above.

Figure 5A:
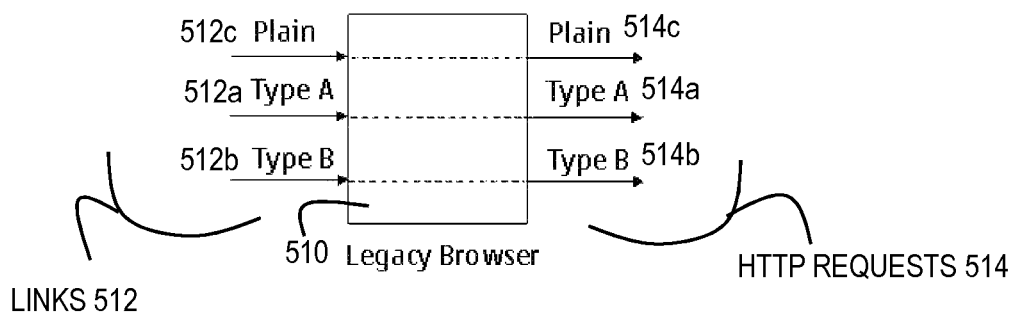
FIG. 5A through FIG. 5C are diagrams that illustrate how clients and servers handle uniform resource locators (URLs) that may carry client platform information, according to various embodiments.
Figure 5B:
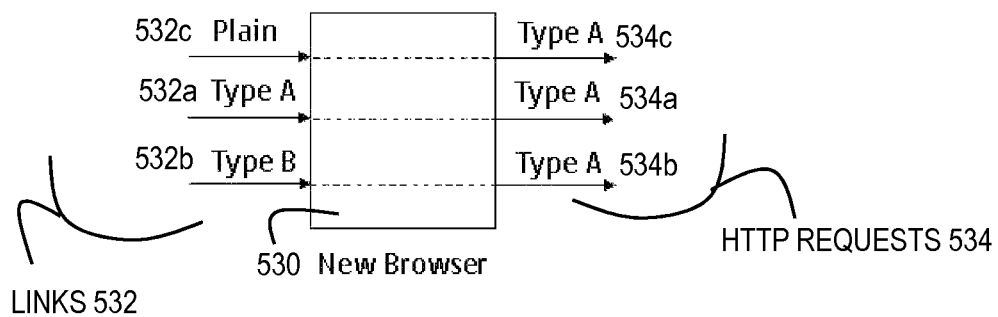
Figure 5C:
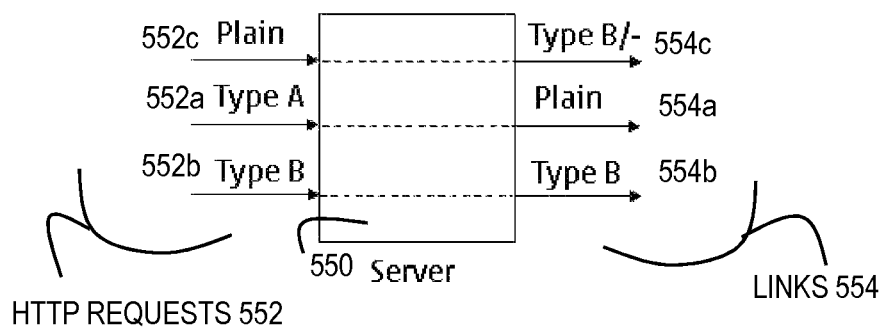

FIG. 5A through FIG. 5C are diagrams that illustrate how clients and servers handle uniform resource locators (URLs) that may carry client platform information, according to various embodiments. FIG. 5A depicts a legacy browser 510, as an example of a legacy HTTP client. When the legacy browser 510 is operated to request any link URL 512, the legacy browser 510 forms a HTTP request message 514 directed to the same URL, unchanged. For example, selecting a link URL 512*a* of type A causes the legacy browser 510 to send a HTTP request message 514*a* directed to the type A URL. Similarly, selecting a link URL 512*b* of type B causes the legacy browser 510 to send a HTTP request message 514*b* directed to the type B URL; and selecting a plain link URL 512*b* causes the legacy browser 510 to send a HTTP request message 514*b* directed to the plain URL.

FIG. 5B depicts a new browser 530, as an example of a modified HTTP client with the client side client platform information transport process 142. When the new browser 530 is operated to request any link URL 532, the new browser 530 forms a HTTP request message 534 directed to a type A URL in every case. For example, selecting a link URL 532*a* of type A causes the new browser 530 to send a HTTP request message 534*a* directed to the type A URL. However, selecting a link URL 532*b* of type B causes the new browser 530 to send a HTTP request message 534*b* directed to the type A URL; and selecting a plain link URL 532*b* causes the new browser 530 to send a HTTP request message 534*b* directed to the type A URL. In each case the client platform information inserted into the URL is that determined by the new browser 530. If a selected URL is of type A or type B and contains client platform information that does not agree with the concerned new browser, they will be replaced with correct information in the final rewritten type A URL sent out to servers.

A server receives a HTTP request message directed to its URL domain and returns a response with zero or more link URLs. FIG. 5C depicts a server 550, as an example of a HTTP server with the server side client platform information transport process 140. When the server 550 is operated to receive a HTTP request message 552 directed to its URL domain, the server 550 forms a HTTP response message with zero or more link URLs 554. For example, when the server 550 is operated to receive a HTTP request message 552*a* directed to its URL domain with a type A URL, the server 550 forms a HTTP response message with a plain link URL 554*a*. When the server 550 is operated to receive a HTTP request message 552*b* directed to its URL domain with a type B URL, the server 550 forms a HTTP response message with a link URL 554*b* of type B. When the server 550 is operated to receive a HTTP request message 552*c* directed to its plain URL domain, the server 550 forms a HTTP response message with a link URL 554*c* of type B if it can infer anything about the client platform information. Otherwise, server 550 does not return content, indicated by the characters "/-" following the string "Type B."

FIG. 6A through FIG. 6B are time sequence diagrams of messages exchanged for transport of client platform information outside of user agent fields, according to various embodiments. In a time sequence diagram, time increases downward and a process on the network is indicated by a vertical bar. Messages between processes are indicated by arrows directed from the sending process to the receiving process. The vertical position of the arrow indicates the time when the message is sent relative to other messages. A step performed by one process for a limited time is represented by a rectangle or bent arrow that extends vertically for the duration of the step. The time is not drawn to a particular scale.

The processes depicted in FIG. 6A are one or more sources 602 of a URL (such as any, several or all of a user, a document or file, or a web page or widget based on a HTTP response from a server such as service 110a or a legacy service). Also depicted is a modified HTTP client 604, e.g., browser 107 with a client side client platform information transport process 142. Also depicted is a HTTP server 606, such as the same service 110a or different service 110b with a server side client platform information transport process 140.

In message 610, the modified HTTP client 604 receives data with one or more link URLs. In step 612, a user selects a link with a plain URL that indicates the domain of HTTP server 606. In response, the modified HTTP client 604 sends a HTTP request message 614 directed to a type A (primary) URL with client platform information for client 604. In response, the HTTP server returns a HTTP response message 616 with plain links only and content tailored to the client platform of modified HTTP client 604.

In step 622, a user selects a link with a primary (type A) URL that indicates the domain of HTTP server 606 and client platform information for a possibly different modified HTTP client. In response, as above, the modified HTTP client 604 sends a HTTP request message 624 directed to a type A (primary) URL with client platform information for client 604. In response, the HTTP server returns a HTTP response message 626 with plain links only and content tailored to the client platform of modified HTTP client 604.

In step 632, a user selects a link with a fallback (type B) URL that indicates the domain of HTTP server 606 and client platform information for a possibly different legacy HTTP client. In response, as above, the modified HTTP client 604 sends a HTTP request message 634 directed to a type A (primary) URL with client platform information for client 604. In response, the HTTP server returns a HTTP response message 636 with plain links only and content tailored to the client platform of modified HTTP client 604.

Thus, fall three types of URLs, a modified HTTP client rewrites the URL into a correct type A URL with its own client platform information and sends the URL in a HTTP request message to the server. The Server returns content that is optimized for the modified HTTP client according to the platform information encoded in the type A URL. The links to other pages in the content are plain URLs. An advantage of this embodiment is that performance is good—there are no third party services for resolving user agent headers and there are no extra roundtrips between HTTP clients and HTTP servers. Servers can always return content that is best optimized for clients.

The processes depicted in FIG. 6B are one or more sources 602 of a URL and an HTTP server 606 (as described above). Also depicted is a legacy HTTP client 608, e.g., a browser without a client side client platform information transport process 142.

In message 640, the legacy HTTP client 608 receives data with one or more link URLs. In step 642, a user selects a link with a plain URL that indicates the domain of HTTP server 606. In response, the legacy HTTP client 608 sends a HTTP request message 644 directed to a plain URL with no client platform information for client 604. In response, the HTTP server returns a HTTP response message 646 with fallback (type B) links only, which have client platform information based on the server's best estimate (e.g., minimal capacity or third party information) and content tailored to the estimated client platform. In some embodiments, the response message 646 merely indicates that no reasonable estimate of client platform values is available and the service cannot be provided.

In some embodiments, the response message 646 includes a script that determines whether a script engine is available to run the comparison script. For example, the script determines whether a Javascript engine is available to run a Javascript comparison script. If not, the message indicates that the user should install the script engine to obtain better service at this site. If so, then in step 648 a comparison script is run to compare the estimated client platform values provided by the server with those known by the client through, at least, the determination of contents for the user agent. An example Javascript to redirect the legacy client to a corrected type B URL is as follows.

```
<html>
  <head>
    <script id="checkUserAgent" language="javascript">
<!--
function checkUserAgent(url) {
  if (navigator.userAgent) {
    // check whether URL agrees with browser's user agent, if not,
construct a new Type B URL according to both the URL and the user
agent and redirect the browser to it
    var newURL = buildNewURL(url, navigator.userAgent);
    if (newURL) {
      window.location = newURL;
    }
  }
}
//-->
    </script>
  </head>
  <body>
//normal content here.
  </body>
</html>
```

In this script, the user agent data is in the data structure called navigator.userAgent and the URL extracted from the HTTP header is in the data structure url. The function buildNewURL compares the values in url to the corresponding values in navigator.userAgent. If they agree, then the value of newURL is null. If not, then the value of newURL is the revised type B URL, and the client is redirected to the new URL by the command window.location=newURL. Statements to implement buildNewURL can be determined by one of ordinary skill in the art. Subsequent selection of links in the HTTP response 646 will be type B URLs with updated client platform information based on the script, which is better suited to the actual client platform.

Thus, when a user selects or enters a plain URL in a legacy browser, the browser sends the URL as it is to the server. The server cannot return an optimized content for the URL if there is no user agent in the HTTP header. The server may try to resolve the user agent header from a third party service or use the comparison script. If the former approach is successful, the server returns content that agrees with the retrieved user agent header from the third party service. The links to other pages in the content are in the format of type B URLs with the same client platform information. If the user agent header cannot be resolved and comparison script cannot be executed, then the server can choose either to serve content for a minimum browser configuration or to display an informative page without continuing any further.

When the user selects any of the type B URLs in the returned content, the legacy browser sends them as they are to the server. Although the user agent header is still missing when the request arrives at the server, the server does not try to resolve it anymore from the third party service. Instead the server relies on the device information encoded in the type B URL to generate an optimized content for the client. Users still experience long latencies due to user agent resolution, but only in the first page of a service. This provides an advantage over prior art approaches that experience such latencies on every page of the service.

In step 652, a user selects a link with a primary type (type A) URL that indicates the domain of HTTP server 606. In response, the legacy HTTP client 608 sends a HTTP request message 654 directed to a type A URL with client platform information for whatever client provide the link, not legacy client 608. In response, the HTTP server returns a HTTP response message 656 with plain URL links only, which have no client platform information. Usually, a user does not enter Type A URL, because Type A URL is transparent to end users. Nonetheless, this could happen, for example, in hacking or copying the HTTP request of a modified client. A legacy browser sends the type A URL as it is to the server. The server returns a content that follows the device information encoded in the type A URL. Obviously, this content could be in a format that is not optimized for the legacy browser. However, the links to other pages in the content are in the format of plain URLs. Therefore, when the user continues browsing, the user goes back to a request message 644 described above with a plain URL, whereupon it becomes possible that the server returns correct content in the next pages.

In step 662, a user selects a link with a fallback (type B) URL that indicates the domain of HTTP server 606. In response, the legacy HTTP client 608 sends a HTTP request message 664 directed to a type B URL with client platform information for whatever client provide the link, not necessarily legacy client 608. In response, the HTTP server returns a HTTP response message 656 with fallback (type B) URL links only. If a comparison script for an installed engine is included, the legacy client updates a selected fallback URL based on the local user agent and the type B URL in step 668, as explained above for step 648. Thus, when a user enters a type B URL in a legacy browser, the browser sends the URL as it is to the server. The server returns content that follows the device information encoded in the type B URL. The links to other pages in the content are also type B URLs. It is possible that the device information encoded in the URLs does not agree with actual configuration of the Legacy Browser. The comparison script provides a remedy for this. Eventually, legacy browsers will be phased out, and this circumstance will diminish in importance.

The processes described herein for ensuring transport of user agent information may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to ensure transport of user agent information to a service provider as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of ensuring transport of user agent information to a service provider.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to ensuring transport of user agent information to a service provider. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

In some of the above embodiments, the link forwarding/sharing problem and the starting phase problem is solved on the client side by URL rewriting, as described above, at a modified HTTP client. This involves some extension to client software, e.g. Firefox Add-on to Firefox browser. With such an extension, whenever a user requests a URL from a client, the extension first checks whether the URL agrees with the client's configuration. If not, the extension converts the URL into a type A format, which has the client configuration encoded in it. For example, when a user enters URL some-site/path in a New Browser on a N95 device, the URL is converted into some-site/path?type=A&device=N95, before it is sent out to the server. A server responds to the request for a Type A URL with an optimized content based on the device information encoded in the URL. However, in the returned content, all other links to the server are not in the format of Type A URL anymore but rather in plain URL like some-site/path/sub-path. Therefore, end users usually do not see Type A URLs in browser address field, in saved page bookmarks, or in page content. URLs always appear in the format of plain URLs in these places. Therefore, in most cases, a remote server can trust the validity of the device information encoded in Type A URL and respond with correct content.

A legacy browser just sends URLs as they are to the server. Without the user agent field, the server cannot respond to a HTTP request for a plain URL with an optimized content. However, some operators provide separate service for servers to acquire the deleted user agent field. Such services usually have performance implications and thus they are unsuitable to use for all the requests. After resolving user agent, the server redirects the legacy browser to a new Type B URL like some-site/path?type=B&device=N95. When the redirected request for type B URL reaches the server again, the server responds with a content that is optimized for the device based on the information encoded in the Type B URL. Unlike type A URL, the server also uses Type B URL for other links to the server in the content for a Type B URL request, for example, some-site/path/sub-path?type=B&device=N95. Therefore, users can see Type B URLs in browser address field, save Type B URLs as bookmarks, or find Type B URLs in page content.

A server uses different strategies with the three types of URLs. For a type A URL, a server generates content according to the client platform field in the URL, but the links in the content are plain URLs. For a type B URL, a server also generates content according to the client platform field in the URL; but, the links in the content are also type B URLs not plain URLs. For a plain URL, a server tries to reconstruct user agent from third party service or HTTPS service or by the comparison script. and but the links in the content are again type B URLs. If user agent data cannot be resolved, the server returns content that is for the minimal browser configuration or simply returns an informative page and does not continue anymore.

Computer system 700 also includes a memory 704 coupled to bus 710. The memory 704, such as a random access memory (RAM) or other dynamic storage device, stores information including processor instructions for ensuring transport of user agent information to a service provider. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for ensuring transport of user agent information to a service provider, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for ensuring transport of user agent information to a service provider from the UE 101.

The term "computer-readable medium" as used herein to refers to any medium that participates in providing information to processor 702, including instructions for execution. Such a medium may take many forms, including, but not limited to computer-readable storage medium (e.g., non-volatile media, volatile media), and transmission media. Nontransitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set 800 upon which an embodiment of the invention may be implemented. Chip set 800 is programmed to ensure transport of user agent information to a service provider as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of ensuring transport of user agent information to a service provider.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to ensure transport of user agent information to a service provider. The memory 805 also stores the data associated with or generated by the execution of the inventive steps.

FIG. 9 is a diagram of exemplary components of a mobile terminal (e.g., handset) for communications, which is capable of operating in the system of FIG. 1, according to one embodiment. In some embodiments, mobile terminal 900, or a portion thereof, constitutes a means for performing one or more steps of ensuring transport of user agent information to a service provider. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support one or more of the steps of ensuring transport of user agent information to a service provider The display 9 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to ensuring transport of user agent information to a service provider. The MCU 903 also delivers a display command and a switch command to the display 907 and to the speech output switching controller, respectively.

Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    causing, at least in part, an insertion of at least part of client platform information into a portion of a header of a hypertext transfer protocol request message other than in a user agent field of the hypertext transfer protocol request message; and
    causing, at least in part, a transmission of the hypertext transfer protocol request message through a network to a remote service provider.

2. A method of claim 1, wherein the portion of the header of the hypertext transfer protocol request message is at least one of a cipher field, a proprietary header field, and a cookie field.

3. A method of claim 2, further comprising:
    receiving one or more scripts within a hypertext transfer protocol response message; and
    processing and/or facilitating a processing of the one or more scripts to cause, at least in part, the insertion of the at least part of the client platform information into the portion of the header of the hypertext transfer protocol request message.

4. A method of claim 3, wherein the portion of the header is a client platform information field.

5. A method of claim 3, further comprising:
    causing, at least in part, a transmission of an original hypertext transfer protocol request message to the remote service provider, wherein the original hypertext transfer protocol request message includes the client platform information in the user agent field,
    wherein the hypertext transfer protocol response message is received in response to transmitting the original hypertext transfer protocol request message.

6. A method of claim 1, further comprising:
    causing, at least in part, an insertion of a type field into a uniform resource locator field of the header of the hypertext transfer protocol request message,
    wherein a value of the type field indicates that a local client process inserted a client platform information field into the uniform resource locator field of the hypertext transfer protocol request message based, at least in part, on the client platform information.

7. A method of claim 1, further comprising:
    causing, at least in part, an insertion of a type field into a uniform resource locator field of the header of the hypertext transfer protocol request message,
    wherein a value of the type field indicates that a local client process did not insert a client platform information field into the uniform resource location field of the hypertext transfer protocol request message.

8. A method of claim 1, wherein the portion of the header of the hypertext transfer protocol request message is a sub-domain portion, a script parameters portion, or a combination thereof of a uniform resource locator field.

9. An apparatus comprising:
    at least one processor; and
    at least one memory including computer program code for one or more programs,
    the at least one memory and the computer program code configured to, with the at least one processor, cause the apparatus to perform at least the following,
        cause, at least in part, an insertion of at least part of client platform information into a portion of a header of a hypertext transfer protocol request message other than in a user agent field of the hypertext transfer protocol request message; and
        cause, at least in part, a transmission of the hypertext transfer protocol request message through a network to a remote service provider.

10. An apparatus of claim 9, wherein the portion of the header of the hypertext transfer protocol request message is at least one of a cipher field, a proprietary header field, and a cookie field.

11. An apparatus of claim 10, wherein the apparatus is further caused, at least in part, to:
    receive one or more scripts within a hypertext transfer protocol response message; and
    process and/or facilitate a processing of the one or more scripts to cause, at least in part, the insertion of the at least part of the client platform information into the portion of the header of the hypertext transfer protocol request message.

12. An apparatus of claim 11, wherein the portion of the header is a client platform information field.

13. An apparatus of claim 11, wherein the apparatus is further caused, at least in part, to:
    cause, at least in part, a transmission of an original hypertext transfer protocol request message to the remote service provider, wherein the original hypertext transfer protocol request message includes the client platform information in the user agent field,
    wherein the hypertext transfer protocol response message is received in response to transmitting the original hypertext transfer protocol request message.

14. An apparatus of claim 9, wherein the apparatus is further caused, at least in part, to:

cause, at least in part, an insertion of a type field into a uniform resource locator field of the header of the hypertext transfer protocol request message, wherein a value of the type field indicates that a local client process inserted a client platform information field into the uniform resource locator field of the hypertext transfer protocol request message based, at least in part, on the client platform information.

15. An apparatus of claim 9, wherein the apparatus is further caused, at least in part, to:

cause, at least in part, an insertion of a type field into a uniform resource locator field of the header of the hypertext transfer protocol request message, wherein a value of the type field indicates that a local client process did not insert a client platform information field into the uniform resource location field of the hypertext transfer protocol request message.

16. An apparatus of claim 9, wherein the portion of the header of the hypertext transfer protocol request message is a sub-domain portion, a script parameters portion, or a combination thereof of a uniform resource locator field.

17. A method comprising:

determining whether a client platform information field is included in a uniform resource locator field of a hypertext transfer protocol request message;

if the client platform information field is not included in the uniform resource locator field, determining whether an alteration of a user agent field within a header of the hypertext transfer protocol request message exists; and causing, at least in part, a creation of a hypertext transfer protocol response message with respect to client platform capabilities based, at least in part, on the determination with respect to the client platform information field, the determination with respect to the alteration of the user agent field, or a combination thereof.

18. A method according to claim 17, if the alteration of the user agent field exists, the creation of the hypertext transfer protocol response message further comprises:

causing, at least in part, an insertion of one or more scripts into a payload portion of the hypertext transfer protocol response message.

19. A method according to claim 18, wherein the one or more scripts include one or more instructions for creating a hypertext transfer protocol request message with a client platform information field within a uniform resource locator.

20. A method according to claim 18, wherein the one or more scripts include one or more instructions for creating a hypertext transfer protocol request message with the client platform information within at least one of a cipher field, a proprietary header field, and a cookie field.

* * * * *